US008987372B2

(12) United States Patent
Hu et al.

(10) Patent No.: US 8,987,372 B2
(45) Date of Patent: Mar. 24, 2015

(54) LOW TEMPERATURE HOT MELT ADHESIVES FOR DISPOSABLE ARTICLES WITH HIGH CREEP RESISTANCE

(71) Applicant: Henkel Corporation, Rocky Hill, CT (US)

(72) Inventors: Yuhong Hu, Belle Mead, NJ (US); Maria Xenidou, Dusseldorf (DE)

(73) Assignee: Henkel US IP & Holding GmbH, Duesseldorf (DE)

( * ) Notice: Subject to any disclaimer, the term of this patent is extended or adjusted under 35 U.S.C. 154(b) by 0 days.

(21) Appl. No.: 13/833,811

(22) Filed: Mar. 15, 2013

(65) Prior Publication Data

US 2013/0202787 A1   Aug. 8, 2013

Related U.S. Application Data

(63) Continuation of application No. PCT/US2012/025609, filed on Feb. 17, 2012.

(60) Provisional application No. 61/444,242, filed on Feb. 18, 2011.

(51) Int. Cl.

| | | |
|---|---|---|
| *C08C 19/44* | (2006.01) | |
| *C08L 53/00* | (2006.01) | |
| *B05D 5/10* | (2006.01) | |
| *C08F 36/00* | (2006.01) | |
| *C08F 12/02* | (2006.01) | |
| *C08F 210/00* | (2006.01) | |
| *C09J 153/02* | (2006.01) | |
| *C09J 5/06* | (2006.01) | |
| *C09J 191/06* | (2006.01) | |
| *C09J 191/08* | (2006.01) | |

(52) U.S. Cl.
CPC ......... *C09J 153/02* (2013.01); *C09J 5/06* (2013.01); *C09J 191/06* (2013.01); *C09J 191/08* (2013.01)
USPC ........ 524/572; 524/505; 427/208.2; 526/346; 526/335; 526/348

(58) Field of Classification Search
CPC .......... C09J 191/06; C09J 5/06; C09J 191/08; C09J 153/02; C08L 91/06; C08L 53/02; C08L 91/00
USPC ........ 427/208.2; 524/572, 505; 526/346, 335, 526/348
See application file for complete search history.

(56) References Cited

U.S. PATENT DOCUMENTS

| | | |
|---|---|---|
| 5,342,858 A | 8/1994 | Litchholt et al. |
| 6,184,285 B1 | 2/2001 | Hatfield et al. |
| 6,218,457 B1 | 4/2001 | Fralich et al. |
| 6,818,093 B1 | 11/2004 | Taal et al. |
| 2004/0077759 A1 | 4/2004 | Bardiot et al. |
| 2005/0176868 A1* | 8/2005 | He et al. ................. 524/487 |
| 2006/0229411 A1 | 10/2006 | Hatfield et al. |
| 2007/0161742 A1 | 7/2007 | He et al. |
| 2009/0120577 A1 | 5/2009 | Eichler-Johnson et al. |
| 2010/0210163 A1 | 8/2010 | He et al. |

FOREIGN PATENT DOCUMENTS

WO   2007047232 A1   4/2007

* cited by examiner

*Primary Examiner* — William Cheung
(74) *Attorney, Agent, or Firm* — Sun Hee Lehmann

(57) ABSTRACT

The present invention is directed to adhesives suitable for application using a hot melt process at a relatively low temperature in the range of about 110° C. to about 130° C. Such adhesives exhibit desirable viscoelastic properties and are suitable for bonding an elastic attachment in the manufacture of disposable articles, such as disposable diapers.

11 Claims, No Drawings

LOW TEMPERATURE HOT MELT ADHESIVES FOR DISPOSABLE ARTICLES WITH HIGH CREEP RESISTANCE

This application is a continuation application of PCT/US2012/025609 filed Feb. 17, 2012, which claims benefit of U.S. Provisional Application No. 61/444,242 filed Feb. 18, 2011.

FIELD OF THE INVENTION

The present invention is directed to adhesives suitable for application using a hot melt process at a relatively low temperature in the range of about 110° C. to about 130° C. Importantly, such adhesives exhibit desirable viscoelastic properties and are suitable for bonding an elastic attachment in the manufacture of disposable articles, such as disposable diapers.

BACKGROUND OF THE INVENTION

Hot melt adhesives for elastic attachment application generally contain 20-35% polymer. Such polymer content results in high viscosity, and thus the typical application temperature is 325° F. (160° C.) or greater. To reduce the energy demands and glue burn-through (hot adhesive partially or completely melts the polymeric substrate) as well as the occupational risks associated with applying hot melt adhesives, there is a need to provide adhesives that are suitable for hot melt applications at lower temperatures. Decreasing the application temperature of the adhesives, however, often leads to negative cohesion and creep resistance of the adhesive.

WO 2007/047232 is directed to a low application temperature hot melt adhesive by utilizing a high softening point mid-block tackifier with SIS copolymer that has 14-35 wt % styrene content and molecular weight of about 100,000 to 200,000 or SBS copolymer that has 20-45 wt % styrene content and molecular weight of about 50,000 to 120,000. The use of high softening point mid-block tackifiers leads to higher viscosity, which limits the application temperature greater than 130° C. Lowering the viscosity with lower softening point mid-block tackifiers, however, leads to negative creep resistance of the adhesive.

There continues to be a need in the art for low application temperature hot melt adhesives, with desirable cohesion and creep resistance. Such attributes would make the adhesive particularly well-suited for use in the manufacture of elastic attachment adhesive. The current invention addresses this need.

SUMMARY OF INVENTION

The present invention provides low application temperature hot melt adhesives which exhibit desirable thermomechanical and viscoelastic properties. In particular, desirable viscosity, crossover temperature, yield stress and creep resistance such that the adhesives of the present invention are suitable for bonding elastomeric material in the manufacture of disposable absorbent articles, such as disposable diapers. Notably, such adhesives provide superior stability at low application temperature and are thus amenable for application to thinner substrates than conventional hot melt adhesives. Additionally, the present invention provides articles of manufacture comprising such adhesives and methods for forming such articles.

In one aspect of the invention, there is provided low application temperature hot melt adhesives comprising (i) at least one styrenic block copolymer which has a melt flow index (MI) greater than 33 measured by ASTM D 1238 and a styrene content greater than 40 wt % based on the total weight of the copolymer, and (ii) a wax, wherein the adhesive has a viscosity less than about 8,500 centipoises at 120° C.

In one embodiment, the low application temperature hot melt adhesives comprise (a) 5 to 20 wt % of the styrenic block copolymer; (b) 0.5 to 5% wt % of the wax; (c) 30-70 wt % of a tackifier; and (d) 0.1-2 wt % of an antioxidant. The aforementioned components total to 100 wt %. In certain other embodiments, the low application temperature hot melt adhesives further comprise up to 30 wt % of an oil.

In certain embodiments, the low application temperature hot melt adhesives have a crossover temperature greater than 60° C. In some embodiments, the crossover temperature is greater than 65° C.

In certain embodiments, the low application temperature hot melt adhesives have a yield stress of greater than 50 psi. In some embodiments, the yield stress is greater than 75 psi.

In one embodiment, the styrenic block copolymer is a styrene-isoprene-styrene (SIS), styrene-butadiene-styrene (SBS) or mixtures thereof.

In one embodiment, the wax is selected from the group consisting of paraffin waxes, microcrystalline waxes, polyethylene waxes, polypropylene waxes, by-product polyethylene waxes, Fischer-Tropsch waxes, oxidized Fischer-Tropsch waxes, functionalized waxes, and mixtures thereof.

In another aspect of the invention, articles comprising a low application temperature hot melt adhesive of the present invention are provided. In one embodiment, the article is a disposable article. In one embodiment, the disposable article is an elastic attachment.

In another aspect of the invention, there are provided methods of forming an article comprising: (i) applying a low application temperature hot melt adhesive of the present invention onto a substrate at a temperature in the range of from about 110° C. to about 130° C. at an add-on-level of about 20 to about 100 mg/m/strand; and (ii) cooling the adhesive to room temperature; wherein the cooled adhesive has a creep performance of less than about 20% after 300% strain is applied at 38° C. for four hours to the adhesive. In one embodiment, the low application temperature hot melt adhesive is applied by strand coating.

In another aspect of the invention, there are provided methods of forming an article comprising: (i) applying the low application temperature hot melt adhesive onto a substrate at a temperature in the range of from about 110° C. to about 130° C. at an add-on-level of about 3 to about 30 mg/in; and (ii) cooling the adhesive to room temperature, wherein the cooled adhesive has a creep performance of less than about 25% after 300% strain is applied at 38° C. for four hours to the adhesive. In one embodiment, the low application temperature hot melt adhesive is applied by spiral coating.

DETAILED DESCRIPTION OF THE INVENTION

All documents cited herein are incorporated in their entireties by reference.

The low application temperature hot melt adhesives of the present invention exhibit desirable properties including a viscosity of less than about 8,500 centipoises (cP) at 120° C. In another embodiment, the viscosity of the hot melt adhesive is less than about 8,000 cP at 120° C. Such viscosity is amenable for application to substrates. Additionally, the low application temperature hot melt adhesives of the present invention exhibit desirable creep resistance as well as exceptional toughness. In certain embodiments, the adhesives of the present invention exhibit a yield stress of greater than about 50 psi. In some embodiments, the adhesives of the present invention exhibit a yield stress of greater than 75 psi. The yield stress is defined as the stress at the yield point under which an adhesive experiences permanent plastic deformation. Prior to the yield point the adhesive will deform elastically and will return to its original shape when the applied stress is removed. Once the yield point is passed some of the deformation will be permanent and non-reversible. The adhesives of the present invention are thus particularly useful in making elastic non-wovens and in the fabrication of disposable absorbent articles (e.g., baby diapers, training pants, adult incontinence briefs or undergarments, and the like).

The hot melt adhesives of the present invention comprise at least one styrenic block copolymer, which has a MI (melt index) greater than 33 measured in accordance with ASTM D 1238 and a styrene content greater than 40 wt % of the copolymer, and a wax and, if desired, a tackifier, an oil and other additives, such as an antioxidant.

The adhesives of the present invention comprise from about 5 to about 20 wt % of at least one styrenic block copolymer which has a MI greater than 33 and a styrene content greater than 40%. Combinations of two or more styrenic block copolymers may be used in the adhesives of the present invention. The MI range or the styrene content of the second styrenic block copolymer is not particularly limiting. Exemplary styrenic block copolymers include styrene-butadiene (SB), styrene-butadiene-styrene (SBS), styrene-isoprene-styrene (SIS), styrene-isoprene (SI), styrene-isoprene-butadiene-styrene (SIBS), styrene-ethylene-butylene-styrene (SEBS), styrene-ethylene-butylene (SEB) styrene-ethylene propylene-styrene (SEPS) and styrene-ethylene propylene (SEP) and styrene-ethylene-ethylene-propylene-styrene (SEEPS or hydrogenated SIBS). Preferred styrenic block copolymers have the general configuration A-B-A wherein the polymer end-blocks A are styrene while the polymer mid-block B is derived from isoprene, butadiene or isobutylene which may be partially or substantially hydrogenated or mixtures thereof. Further, the copolymers may be linear or branched. Notably, a styrene content of greater than 40% in the styrenic block copolymers reinforces creep resistance while a melt flow index greater than 33 enables a desirable viscosity. Exemplary styrenic block copolymers for use in the present invention include, but are not limited to, styrene-isoprene-styrene, styrene-butadiene-styrene or mixtures thereof.

The adhesives of the invention will comprise from about 0.5 wt % up to about 5 wt % of at least one wax. In one embodiment, the adhesives of the present invention will comprise from about 2 to about 5 wt % of at least one wax. Suitable waxes for use in the present invention include, but are not limited to, paraffin waxes, microcrystalline waxes, polyethylene waxes, polypropylene waxes, by-product polyethylene waxes, Fischer-Tropsch waxes, oxidized Fischer-Tropsch waxes and functionalized waxes such as hydroxy stearamide waxes and fatty amide waxes. It is common in the art to use the terminology synthetic high melting point waxes to include high density low molecular weight polyethylene waxes, by-product polyethylene waxes and Fischer-Tropsch waxes. Modified waxes, including vinyl acetate modified waxes such as AC-400 (Honeywell) and MC-400 (available from Marcus Oil Company), maleic anhydride modified waxes such as Epolene C-18 (available from Eastman Chemical) and AC-575A and AC-575P (available from Honeywell) and oxidized waxes may be used in the practice of the invention. Combinations of two or more waxes may be used in the adhesives of the present invention. Preferred waxes for the adhesive include Fischer-Tropsch waxes and oxidized Fischer-Tropsch waxes.

The adhesives of the present invention will typically comprise from about 30 to about 70 wt % of tackifying resins. In certain embodiments, the adhesives of the present invention comprise from about 50 to about 70 wt %. In certain embodiment, the adhesives of the present invention comprise from about 60 to about 67 wt % of at least one tackifying resin. Preferred are tackifiers having a Ring and Ball softening point above about 25° C. Suitable tackifiers include any compatible resins or mixtures thereof such as (1) natural or modified rosins such, for example, as gum rosin, wood rosin, tall-oil rosin, distilled rosin, hydrogenated rosin, dimerized rosin, and polymerized rosin; (2) glycerol and pentaerythritol esters of natural or modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, e.g., styrene/terpene and alpha methyl styrene/terpene; (4) polyterpene resins having a softening point, as determined by ASTM method E28,58T, of from about 80° C. to 150° C.; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof, for example, as the resin product resulting from the condensation, in an acidic medium, of a bicyclic terpene and phenol; (6) aliphatic petroleum hydrocarbon resins having a Ball and Ring softening point of from about 70° C. to 135° C.; the latter resins resulting from the polymerization of monomers consisting of primarily of olefins and diolefins; also included are the hydrogenated aliphatic petroleum hydrocarbon resins; (7) alicyclic petroleum hydrocarbon resins and the hydrogenated derivatives thereof; and (8) aliphatic/aromatic or cycloaliphatic/aromatic copolymers and their hydrogenated derivatives.

Preferably, tackifying resins have a ring and ball softening point, typically measured in accordance with ASTM E28, less than about 105° C.

Exemplary tackifing resins for use in the adhesives of the present invention include, but are not limited to, aliphatic C5 resin such as Wingtack 95 from Cray Valley, Escorez 1310 from ExxonMobil Chemical Company; hydrogenated or partially hydrogenated aliphatic resins such as Eastotac H100R from Eastman; dicyclopentadiene (DCPD) resin such as Escorez 5400 from Exxon Mobil Chemical Company; aliphatic/aromatic or cycloaliphatic/aromatic C5/C9 resins such as ESCOREZ 5600 available from Exxon; esterified pentaerythritol resins such as Sylvalite RE100L available from Arizona Chemical and styrenated terpene resins such as Zonatac 105LT from Arizona Chemical. The desirability and selection of the particular tackifying resin can depend upon the specific styrenic block copolymer employed. Combinations of two or more tackifying resins may be used in the adhesives of the present invention.

Additionally, it may be desirable to incorporate in the adhesive up to about 30 wt % of an end block tackifying resin. End block tackifying resins reside predominantly in the non-elastomer blocks of the thermoplastic elastomer after the adhesive is cooled. Representative of such resins are the primarily aromatic resins based on mixed C9 petroleum distillation streams such as the Norsolene resins from Cray Valley, or resins based on pure or mixed monomer streams of aromatic monomers such as homo or copolymers of vinyl toluene, styrene, alpha-methyl styrene, coumarone or indene. Preferred are those based on alpha-methyl styrene available from Eastman under the Kristalex trade name. If present, the end block resin is generally used in an amount of from about 5 to about 30 wt %, preferably less than about 20 wt %.

There may also be present in the adhesive up to about 30 wt % of an oil which is primarily aliphatic in character and is compatible with the styrenic block copolymer. Examples include plasticizers such as paraffinic and naphthenic petroleum oils, highly refined aromatic-free paraffinic and naphthenic food and technical grade white petroleum mineral oils. Suitable oils include, but are not limited to, a blend of crude oils, such as Calsol 5550 available from Calumet.

One or more additives may optionally be added to the compositions of the present invention and include but are not limited to conventional additives including antioxidants (e.g., CIBA® IRGANOX® 1010 (commercially available from CIBA Specialty Chemicals, Inc., Basel, Switzerland), pigments, anti-azurants, accelerators, stabilizers, plasticizers and ionomer resins. Such additives are known to the person skilled in the art.

Antioxidants may be present in an amount of up to about 3 wt %. Exemplary stabilizers or antioxidants include, but are not limited to, high molecular weight hindered phenols and multifunctional phenols such as sulfur and phosphorous-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. Representative hindered phenols include: 1,3,5-trimethyl 2,4,6-tris(3,5-di-tert-butyl-4-hydroxybenzyl)benzene; pentaerythrityl tetrakis-3(3,5-di-tert-butyl4-hydroxyphenyl)-propionate; 4,4'-methylenebis(2,6-tert-butylphenol); 4,4'-thiobis(6-tert-butyl-o-cresol); 2,6-di-tert-butylphenol; 6-(4-hydroxyphenoxy)-2,-4-bis(n-octylthio)-1,2,5-triazine; di-n-octadecyl3,5-di-tert-butyl-4-hydro-xybenzyl phosphonate; 2-(n-octylthio)ethyl 3,5-di-tert-butyl-4-hydroxybenz-oate; and sorbitol hexa[3-(3,5-di-tert-butyl-4-hydroxyphenyl)-propionate].

Ionomer resins may be present in an amount of up to about 3 wt %. Exemplary ionomer resins include polymers and copolymers comprising moieties selected from the group consisting of carboxylate, sulphonate and phosphonate, which moieties are at least partly neutralized by metallic ions selected from the group consisting of $Na^+$, $Li^+$, $Ca^{++}$, $Mg^{++}$, $Zn^{++}$, $Ba^{++}$ and $Al^{+++}$.

The combination of a wax and a block copolymer, which has a styrene content greater than 40 wt % and MI value greater than about 33 measured in accordance with ASTM D 1238, results in low viscosity and high yield stress adhesive. The adhesive also has desirable thermomechanical and viscoelastic properties. The hot melt adhesive of the invention has high crossover temperature and good creep resistance. The crossover temperature is the temperature where the storage (or elastic) modulus (G') and viscous modulus (G") crossover on the axes of the same scale on a log-log plot of a temperature scan. The inventive adhesive has a crossover temperature great than 65° C. A crossover temperature greater than such value minimizes cold flow and the adhesive is able to withstand high fluctuations of warehouse and transportation temperatures for long periods.

For those composites comprising an elastic attachment, "creep-resistance" or "creep-resistance value" refers to the holding power of a particular elastic attachment. For example, if an adhesive is applied to a substrate, and an elastic attachment is then pressed against the adhesive to bond the elastic attachment to the substrate, then creep resistance is a measure of the quality of the adhesive bond between the elastic attachment and the substrate. Generally the elastic attachment will be sandwiched between two substrates, or will be enclosed by folding a substrate over the elastic attachment. Creep resistance is defined in percent as the ability to resist deformation when a constant stress is applied to a sample. Creep resistance is dependent on the adhesive add-on levels on the sample and the stress applied on the sample. It is preferable to have high resistance to deformation and overall low creep resistance percentage. The creep resistance percentage is calculated on the differences on the length divided by the initial length.

The adhesives of the present invention may be prepared using techniques known in the art. Typically, the adhesive compositions are prepared by blending the components in the melt at a temperature of about 100° C. to 200° C. until a homogeneous blend is obtained. Various methods of blending are known and any method that produces a homogeneous blend is satisfactory.

Hot melt application of adhesives are well known to one of skill in the art. The adhesives of the present invention may be applied to a desired substrate by any method known in the art, and include, without limitation roll coating, painting, drybrushing, dip coating, spraying, slot-coating, swirl spraying, printing (e.g., ink jet printing), flexographic, extrusion, atomized spraying, gravure (pattern wheel transfer), electrostatic, vapor deposition, fiberization and/or screen printing.

The adhesives of the invention are useful as construction adhesives, core adhesives or elastic adhesives, and are particularly suitable for use in the manufacture of articles, including but not limited to disposable absorbent articles, such as diapers, adult incontinent products, bed pads; sanitary napkins, and in other absorbent products, such as, bibs, wound dressings, and surgical capes or drapes, which are used to absorb a liquid, such as water and saline, and body liquids, such as urine, menses, and blood. The adhesive may be used to adhere a nonwoven or tissue to another substrate or component. The second substrate may be another nonwoven, tissue, or an unrelated material.

The present invention provides articles comprising the low application temperature hot melt adhesives of the present invention described herein. Such articles include, but are not limited to, disposable articles including those with or without an elastic attachment.

Exemplary disposable articles include, but are not limited to, absorbent articles comprising a liquid permeable topsheet, a liquid impermeable back sheet and an absorbent member interposed between the topsheet and the back sheet. Typically, the back sheet will be a composite sheet comprising a liquid impermeable sheet and a nonwoven fabric joined to each other by an adhesive. As an absorbent article is made, it generally undergoes a number of different steps in which components or pieces are connected to one another. For example, portions of the topsheet and backsheet typically are bonded together. Also, to the extent the absorbent structure or product incorporates elastomeric regions such as elasticized waistbands or elasticized leg bands or leg cuffs, elastic attachments are typically bonded to a portion of one or more base materials, substrates, or webs.

The adhesives of the present invention find particular use in elastic attachment applications in the manufacture of articles comprising an elasticized region, such as is found in disposable absorbent garments comprising one or more elastic cuffs positioned to contact the legs and/or waist of the wearer.

"Elastic strand," as used herein, comprises polymeric constituents such as, but not limited to: polyetherester; polyurethane; polyamide; polyacrylate; or combinations thereof, including random, block, or graft copolymers such as polyester-b-polyurethane block copolymers, polyether-b-polyurethane block copolymers, styrenic block copolymers, and/or polyether-b-polyamide block copolymers. Examples of elastic strand include LYCRA, a multifilament elastomeric thread sold by Invista, Inc., and FULFLEX® brands from Fulflex Elastomerics.

The term "nonwoven" or "nonwoven web" refers to a web of material that is formed without the aid of a textile weaving or knitting process. The term "fabrics" is used to refer to all of the woven, knitted, and nonwoven fibrous webs.

The adhesives of the present invention are particularly useful to secure an elastic attachment. Materials with excellent stretchability and elasticity are needed to manufacture a variety of disposal and durable articles such as, for example, incontinence pads, disposable diapers, training pants, clothing, undergarments, sports apparel, automotive trim, weather-stripping, gaskets, and furniture upholstery. Stretchability and elasticity are performance attributes that can, for example, function to effectuate a closely conforming fit to the body of a wearer or to the frame of an item. While numerous materials are known to exhibit excellent stress-strain properties and elasticity at room temperatures, it is often desirable for elastic materials to provide a conforming or secure fit during repeated use, extensions and retractions at elevated temperatures such as at body temperatures or in automobile interiors during summer months. The adhesives find particular use as elastic attachment adhesive for use in non-woven applications such as baby diaper or adult incontinence items.

In addition to the non-woven markets, the hot melt adhesives of the invention are useful in the packaging, converting and bookbinding markets where the desire is to reduce application temperature and, at the same time, keep the toughness and strength of the adhesive.

Methods of applying adhesives to an article are well known in the art. Suitable methods include, but are not limited to, strand coating and spiral coating.

In one aspect of the invention, there are provided methods of forming an article comprising: (i) applying a low application temperature hot melt adhesive of the present invention onto a substrate at a temperature in the range of from about 110° C. to about 130° C. at an add-on-level of about 20 to about 100 mg/m/strand; and (ii) cooling the adhesive to room temperature, wherein the adhesive has a creep performance of less than about 15% after 300% strain is applied at 38° C. for four hours to the adhesive. In certain embodiments, the low application temperature hot melt adhesives of the present invention are applied onto a substrate at a temperature in the range of from about 110° C. to less than 130° C. In one embodiment, the low application temperature hot melt adhesive is applied by strand coating.

In another aspect of the invention, there are provided methods of forming an article comprising: (i) applying the low application temperature hot melt adhesive of claim 1 onto a substrate at a temperature in the range of from about 110° C. to about 130° C. at an add-on-level of about 3 to about 30 mg/in; and (ii) cooling the adhesive to room temperature, wherein the adhesive has a creep performance of less than about 25% after 300% strain is applied at 38° C. for four hours to the adhesive. In certain embodiments, the low application temperature hot melt adhesives of the present invention are applied onto a substrate at a temperature in the range of from about 110° C. to less than 130° C. In one embodiment, the low application temperature hot melt adhesive is applied by spiral coating.

The invention may be further understood with reference to the following non-limiting examples.

EXAMPLES

Thermomechanical and viscoelastic properties of adhesives provided by the present invention may be evaluated in accordance with the tests described below.

Melt viscosity of the adhesives is determined on a Brookfield Model RVT Thermosel viscometer using a number 27 spindle.

Tensile performance of the adhesive is determined on 0.125" thick, 2.5" long dogbone shaped portions with 1"×1 "end tabs and a 0.5"×0.5" central gage portion. These are pulled on an Instron with pneumatic grips at a speed of 12"/min.

Mechanical Dynamic Performance of the hot melt adhesive is determined by a Rheometrics Dynamic Mechanical Analyzer (Model RDA III) to obtain the elastic (G') and loss (G") moduli versus temperature. The instrument is controlled by TA Orchestrator software version 7.2.0.2. Parallel plates 7.9 mm in diameter and separated by a gap of about 2 mm. The adhesive sample is loaded and then cooled to about −30° C., and the time program was started. The program test increases the temperature at 5° C. intervals followed by a soak time at each temperature of 10 seconds. The convection oven containing the sample is flushed continuously with nitrogen. The frequency is maintained at 10 rad/s. The initial strain at the start of the test is 0.05% (at the outer edge of the plates). An autostrain option in the software is used to maintain an accurately measurable torque throughout the test. The option is configured such that the maximum applied strain allowed by the software is 30%. The autostrain program adjusts the strain at each temperature increment, if warranted, using the following procedure. The shear storage or elastic modulus (G') and the shear loss modulus (G") are calculated by the software from the torque and strain data. The crossover temperature was measured as the point where tan d=1, where the storage (or elastic) modulus (G') and shear loss modulus (G") crossover on the axes of the same scale on a log-log plot of a temperature scan.

Creep Performance is evaluated by measuring how much a free-end elastic strand retracts under the stretched condition at end-use temperature (38° C./100° F.) during a 4-hour period.

The length of a filament (e.g., spandex) adhered in the stretched condition between two nonwoven sheets or a nonwoven sheet and a polymeric film is measured ("starting length"). Both ends of the spandex are cut and the amount that the resulting free-end filament retracts is measured following a 4 hour period at 38° C. The percent creep is then calculated in the following manner:

$$\% \text{ creep} = \frac{\text{starting length} - \text{final length} \times 100\%}{\text{starting length}}$$

For example, if the initial distance between marks is 20 cm and the final distance between the marks is 15 cm, the percent creep is 25%. Preferably, five samples for each condition are tested and the results averaged for each elastic strand.

When testing creep performance by either spiral or strand application, the non-woven substrate used is 13.5 gsm spunbond, made by Avgol, the polypropylene film is 0.5 mil Pliant poly film, supplied by Pliant Corporation, and the spandex used is 620 Decitex (LYCRA®XA®) and the draft of the fiber was 4.0×.

When measuring creep performance for a bond made through strand coating, adhesive is applied at a temperature in the range of about 110° C. to about 130° C. on the nonwoven substrate and spandex with a strand coating pattern in a continuous mode using a high speed laminator at 300 fpm and an open time of 0.1 sec and an ITW omega applicator. The adhesive add on level is 35 mg/m/strand with three elastic fibers.

When measuring creep for a bond made through spiral coating, adhesive is applied at a temperature in the range of about 110° C. to about 130° C. on the nonwoven substrate and spandex with an unwrapped spiral pattern in an intermittent mode using high speed laminator at 300 fpm with 0.1 sec open time and a Nordson 0.018" spiral applicator. The adhesive add-on level is 8 mg/in with three elastic fibers being attached to the non-woven substrate.

Example 1

Table 1a below illustrates the wt % of components for three different compositions of the present invention (i.e., Samples 1-3) and a reference composition (i.e., Reference A). Notably, in contrast to the three different compositions in accordance with the present invention, the composition of Reference A does not include any wax.

TABLE 1a

| Component | | Reference A | Sample 1 | Sample 2 | Sample 3 |
|---|---|---|---|---|---|
| SIS, 44% styrene, 40 MI | Vector 4411 | 9.0% | 9.0% | 9.0% | 8.0% |
| SIS, 30% styrene, 11 MI | Vector 4293A | 8.0% | 8.0% | 8.0% | 8.0% |
| Tackifier(s) | Ring and Ball softening point less than 105° C. | 62.7 | 62.7 | 62.7 | 63.2 |
| oil | Calsol 5550 | 20.0% | 18.0% | 17.0% | 16.5% |
| F-T Wax | Sasol H1 Wax | 0% | 2.0% | 3.0% | 4.0% |
| Antioxidant | Irganox 1010 | 0.3% | 0.3% | 0.3% | 0.3% |
| | | 100% | 100% | 100% | 100% |

Table 1b below illustrates various properties of the compositions described in Table 1a. Namely, viscosity at a temperature of 120° C., crossover temperature, yield stress and creep. In particular, Table 1b illustrates creep of the adhesives when coated at a temperature of 120° C. and (i) applied by spiral coating with an adhesive add-on-level of 8 mg/inch or (ii) applied by strand coating with an adhesive add-on-level of 35 mg/m/strand.

TABLE 1b

| Property | Desired Range | Reference A | Sample 1 | Sample 2 | Sample 3 |
|---|---|---|---|---|---|
| Viscosity @120° C. | <8,500 cps | 7675 | 7550 | 7775 | 6450 |
| Crossover Temp (° C.) | >65° C. | 66.4 | 68.5 | 67.7 | 65.4 |
| Yield Stress (psi) | >50 psi | 18.0 | 79.1 | 113.4 | 172.6 |
| Creep 8 mg/in, Spiral | <25% | 41.4% | 27.3% | 17.4% | 24.5% |
| Creep 35 mg/m/strand, Strand coating (Omega) | <20% | 21.2% | 12.2% | 7.6% | Not available |

As reflected in Table 1b, the composition of Reference A has a relatively low yield stress and high creep in comparison to Samples 1-3. Accordingly, the presence of wax achieves desirable levels of yield stress and creep for the low melt temperature adhesives of the present invention. This is particularly striking as a relatively low amount of wax was incorporated into the compositions of the present invention yet creep resistance increased significantly. Notably, the levels of yield stress and creep resistance are particularly important when adhesives are used with an elastic attachment, such as a disposable diaper.

Example 2

Table 2a below illustrates the wt % of components for a composition of the present invention (i.e., Sample 2) and two reference compositions (i.e., References B and C). Notably, in contrast to Sample 2 of the present invention, the compositions of References B and C include styrenic resin that has a styrene content less than 40% and melt flow index less than 33.

TABLE 2a

| Component | | Sample 2 | Reference B | Reference C |
|---|---|---|---|---|
| SIS, 30% styrene, 13 MI | Vector 4211 | 0% | 5.2% | 5.2% |
| SIS, 44% styrene, 40 MI | Vector 4411 | 9.0% | 0% | 0% |

TABLE 2a-continued

| Component | | Sample 2 | Reference B | Reference C |
|---|---|---|---|---|
| SIS, 30% styrene, 11 MI | Vector 4293A | 8.0% | 10.0% | 10.0% |
| Tackifier(s) | Ring and Ball Softening Point less than 105° C. | 62.7% | 53.0% | 51.0% |
| Tackifier(s) | Ring and Ball Softening Point less than 95° C. | | | 13.0% |
| oil | Calsol 5550 | 17.0% | 17.5% | 17.5% |
| F-T wax | Paraffin H4 wax | 3.0% | 3.0% | 3.0% |
| Antioxidant | Irganox 1010 | 0.3% | 0.3% | 0.3% |
| | | 100% | 100% | 100% |

Table 2b below illustrates various properties of the compositions described in Table 2a and a desired range for such properties. Namely, viscosity at a temperature of 120° C., crossover temperature, yield stress and creep. In particular, Table 2b illustrates creep of the adhesives when coated at a temperature of 120° C. and (i) applied by spiral coating with an adhesive add-on-level of 8 mg/inch or (ii) applied by strand coating with an adhesive add-on-level of 35 mg/m/strand.

TABLE 2b

| Property | Desired Range | Sample 2 | Reference B | Reference C |
| --- | --- | --- | --- | --- |
| Viscosity @120° C. | <8,500 cps | 7775 | 6250 | 6250 |
| Crossover Temp (° C.) | >65° C. | 67.7 | 62.2 | 59.9 |
| Yield Stress (psi) | >50 psi | 113.4 | 94.5 | 72.7 |
| Creep 8 mg/in, spiral | <25% | 17.4% | 30.3% | 34.8% |
| Creep 35 mg/m/strand, Omega | <15% | 7.6% | Not available | Not available |

As reflected in Table 2b, all the properties for the composition of Sample 2 fall within the desired range. In contrast, although the viscosity and yield stress for the compositions of References B and C fall within the desired range, the crossover temperature and creep fall outside of the desired range. Adhesive compositions formulated with a styrenic resin that has a styrene content less than 40 wt % and melt index less than 33 fail to lead to lower crossover temperature. Crossover temperatures less than 65° C. tend to lead to cold flow on the substrate which is not desirable. Accordingly, the presence of Vector 4411, a SIS with a relatively high styrene content and MI, is critical to achieve the desired crossover temperature and creep desired for the low melt temperature adhesives of the present invention. Such levels of crossover temperature and creep resistance are particularly important when adhesives are used with an elastic attachment, such as a disposable diaper.

The invention claimed is:

1. A low application temperature hot melt adhesive consisting essentially of:
   (a) 5 to 20 wt % of the styrenic block copolymer that (i) has a melt flow index greater than 33, measured in accordance with ASTM D 1238, and (ii) has a styrene content greater than 40%;
   (b) 0.5 to 5% wt % of the wax;
   (c) 30-70 wt % of a tackifier that has a ring and ball softening point less than about 105° C.;
   (d) 0.1-2 wt % of an antioxidant; and
   (e) optionally, up to 30 wt % of an oil
   wherein the adhesive has a viscosity less than about 8,500 centipoises at 120° C.; and
   wherein the adhesive has a creep performance of less than about 25% after 300% strain applied at 38° C. for four hours.

2. The low application temperature hot melt adhesive of claim 1 wherein the tackifier is selected from the group consisting of aliphatic C5 resins, aliphatic resins, dicyclopentadiene resins, C5/C9 blended resins and mixtures thereof.

3. The low application temperature hot melt adhesive of claim 1 wherein the adhesive has a crossover temperature greater than 60° C.

4. The low application temperature hot melt adhesive of claim 3 wherein the crossover temperature, measured as the point where tan d=1, is greater than 65° C.

5. The low application temperature hot melt adhesive of claim 1 wherein the adhesive has a yield stress of greater than 50 psi.

6. The low application temperature hot melt adhesive of claim 5 wherein the yield stress is greater than 75 psi.

7. The low application temperature hot melt adhesive of claim 1 wherein the styrenic block copolymer is a styrene-isoprene-styrene, styrene-butadiene-styrene or mixtures thereof.

8. The low application temperature hot melt adhesive of claim 1 wherein the wax is selected from the group consisting of paraffin waxes, microcrystalline waxes, polyethylene waxes, polypropylene waxes, by-product polyethylene waxes, Fischer-Tropsch waxes, oxidized Fischer-Tropsch waxes, functionalized waxes, and mixtures thereof.

9. An article comprising the low application temperature hot melt adhesive of claim 1.

10. The article of claim 9 which is a disposable article.

11. The article of claim 10 which is an elastic attachment.

* * * * *